June 15, 1965 A. C. ROBERT 3,189,300
SYSTEM FOR THE SELF-GUIDANCE OF A MISSILE
TO A MOVING TARGET
Filed March 23, 1960 2 Sheets-Sheet 1

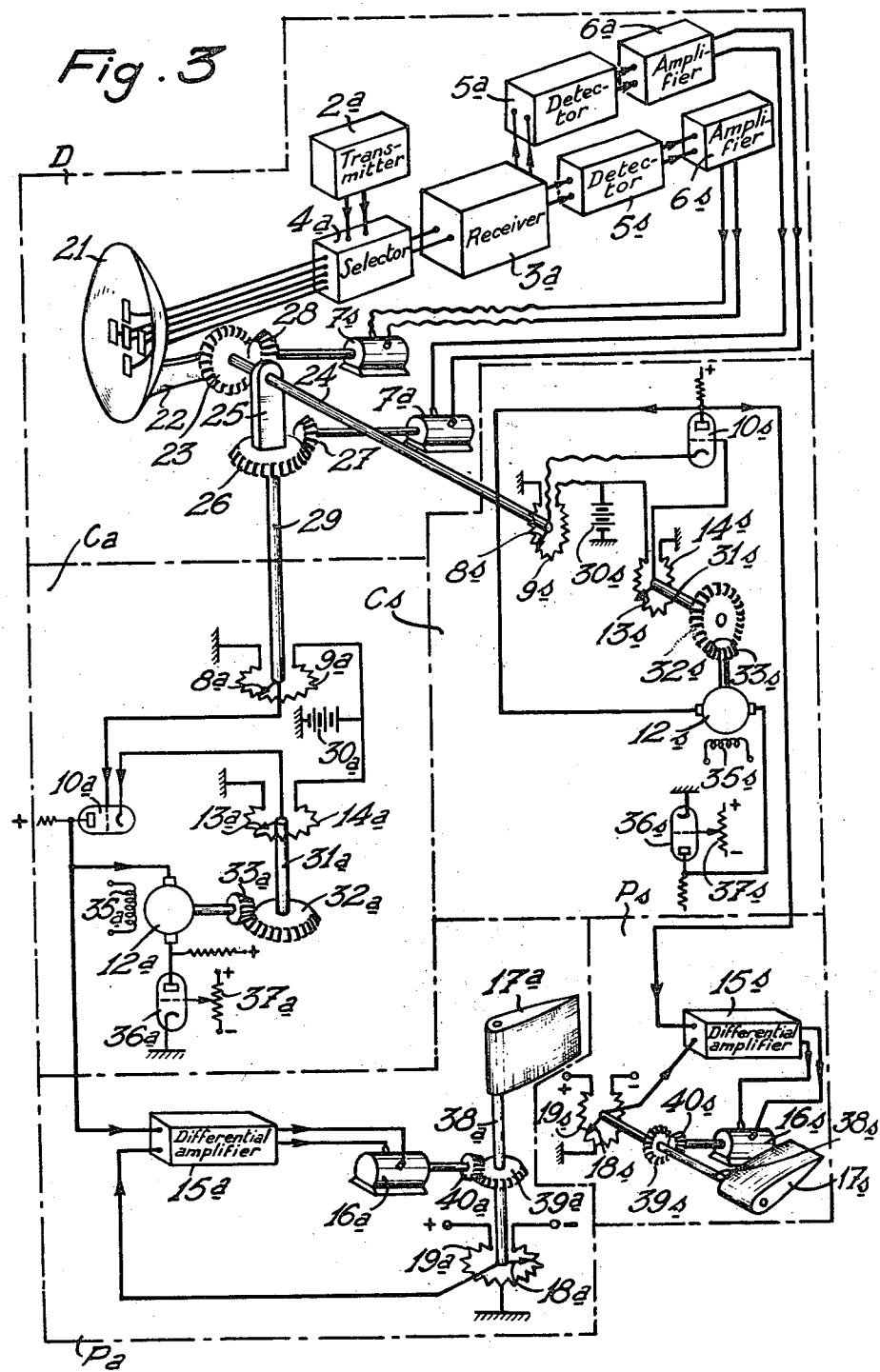

3,189,300
SYSTEM FOR THE SELF-GUIDANCE OF A MISSILE TO A MOVING TARGET
André Charles Robert, Paris, France, assignor to Sud-Aviation Societe Nationale de Constructions Aeronautiques, Paris, France
Filed Mar. 23, 1960, Ser. No. 17,084
Claims priority, application France, Mar. 31, 1959, 790,732, Patent 1,265,834
8 Claims. (Cl. 244—14)

The present invention relates to a self-guidance method for missiles designed to intercept moving targets, say enemy bombers, and to devices for performing said method.

The target having been located and its flight characteristics determined from the ground, the missile, which is launched after its ramp has been suitably oriented, is fetched into the horizontal plane of the target and guided along that plane so that it is brought in position for its self-guidance system to operate. This is the pre-guidance phase, during which the missile is spotted from the ground and remotely controlled in accordance with orders emanating from the ground computer, which is charged to formulate the missile trajectory in accordance with the evolutions of the target.

In the next phase, the missile reaches the vicinity of the target, say 6 to 12 miles away, the self-guidance system according to the invention is sensitized, and the data which it gathers are processed by the computer. In accordance with methods well-known per se, which are outside the scope of the present invention, the computer designates the target in cases where several possible targets are within range of the self-guidance system, ensures locking-on to that specific target and, through the medium of the remote-control system, transmits to the missile order to stand on the course to the target. Thenceforward, the missile receives its guidance orders from its self-guidance system, and this is the final guidance phase which forms the object of the present invention.

As is well known, most of the navigational laws operating by alignment or constant bearing angle cannot be used for the pursuit of a target by a missile, owing to the too-high load factors which they involve for the missile at the end of its trajectory.

Moreover, navigation on a collision course, with a constantly nil load factor, is physically virtually unachievable.

Only proportional navigation, with a suitable proportionality coefficient between the missile load factor and the angular velocity of the missile-target line, provides for satisfactory interception. In most cases, however, this form of navigation requires that the angular velocity of the missile-target line be measured in relation to the direction of the missile velocity, and, as is well known, such measurements are, in the present state of the art, difficult to make correctly, since the angular speed referred to can be extremely low, for instance of the order of 0.01 radian per second.

The present invention has for its object a method for the self-guidance of a missile to a moving target by approximate proportional navigation, whereby the instantaneous true bearing angle of the target relative to the missile axis is maintained in follow-up relation with the instantaneous desired bearing angle, this instantaneous desired bearing angle is continuously corrected in order to make it tend towards the instantaneous collision-course angle by continuously deducting, from the desired bearing angle, an angle which is proportional to the integral in terms of time, taken from the instant of launch, of the angular difference between the true and desired bearing angles, and the missile flight control surfaces are deflected proportionally to this angular difference.

The navigational law is of the form:

$$a\int_0^t \delta dt - \delta + \alpha = b$$

where $\alpha$ is the true bearing angle, $b$ the initial value of this true bearing angle, $\delta$ the angular difference between the true and desired bearing angles and $a$ a constant representing the transfer constant of the guidance servomechanism.

The invention further has for its object a device for the self-guidance of a missile to a moving target, to allow the method specified hereinabove to be performed, said device comprising an angle detecting and spotting unit which gives continuously the value of the instantaneous true bearing angle and feeds this data into an analog calculating device which determines the quantity $\delta$, this calculating device furnishing, to a piloting device, an order which is a function of this quantity with a view to impart to the missile a load factor which is proportional to said quantity $\delta$.

Further features of the invention will appear from the following description, given in connection with the accompanying drawings provided by way of example only and not in a limiting sense, and which will give a clear understanding of how the invention may be performed. In the drawings:

FIG. 3 is a diagrammatic perspective view of a self-guidance system according to the invention.

Figure 1:
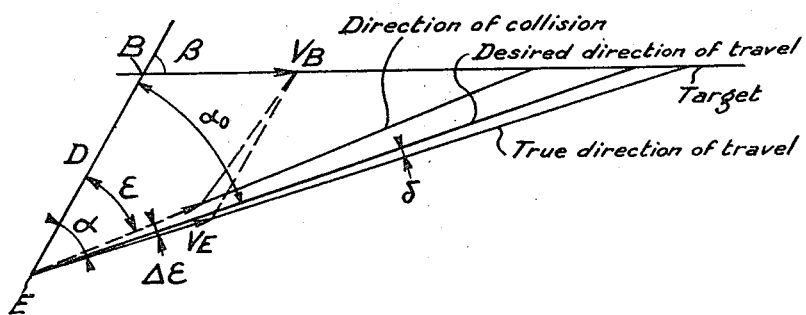
FIG. 1 is the basic diagram for determining the approximately proportional navigational law in conformity with the invention.

It is assumed that at a given instant the missile E and the target B are separated by a distance D, their respective velocities being $V_E$ and $V_B$, and that the missile is required to navigate so that the desired bearing angle shall be $\alpha_0$.

If this desired bearing angle $\alpha_0$ is equal to the angle $\Sigma$ which ensures navigation on a collision course, the trajectory will be rectilinear.

But, in the general case, $\alpha_0$ differs from $\Sigma$ and the trajectory is in fact a curved one. The missile must assume a load factor and an order must be transmitted to the missile flight controls. The consequence of this requirement is that the bearing angle $\alpha$ along which the missile is in fact travelling differs by a small quantity $\delta$ from the desired bearing angle $\alpha_0$, namely $\alpha_0 = \alpha - \delta$.

In what follows, the index $t$ will be used for instantaneous values.

The theoretical instantaneous collision angle $\Sigma_t$ is given by:

$$(V_E \sin \Sigma_t = V_B \sin \beta_t \tag{1}$$

If $\Delta\Sigma_t$ is the error of $\alpha_t$ with respect to $\Sigma_t$, the missile target line rotates in space through an angle defined by:

$$\frac{\partial \alpha_t}{\partial t} = \Delta\Sigma_t \frac{V_E \cos \alpha}{D_t}$$

To this rotation corresponds an equal rotation of the angle $\beta$ given by:

$$\frac{\partial \beta_t}{\partial t} = \Delta\Sigma_t \frac{V_E \cos \alpha}{D_t} = \Delta\Sigma_t \frac{V_E \cos \Sigma_t}{D_t}$$

if $\Delta\Sigma_t$ is small.

To the evolution of $\beta$ there corresponds an evolution of the associated collision angle $\Sigma$, whence, from Formula 1:

$$\frac{\partial \Sigma_t}{\partial_t} = \frac{\partial \beta_t}{\partial_t} \cdot \frac{V_B \cos \beta_t}{V_E \cos \Sigma_t}$$

The angular difference $\delta$ defined precedingly is directly proportional to $\Delta\Sigma_t$ and inversely proportional to the gain $G$ of the guidance servo-mechanism. Whence, $$\delta = \frac{1}{G} \cdot \Delta\Sigma_t \cdot \frac{V_E \cos \Sigma_t}{D_t} = \frac{1}{G} \cdot \frac{\partial \beta_t}{\partial_t}$$

or $$\delta = \frac{1}{G} \cdot \frac{V_E \cos \Sigma_t}{V_B \cos \beta_t} \cdot \frac{\partial \Sigma_t}{\partial_t} = K_2 \frac{\partial \Sigma_t}{\partial_t}$$

with $$K_2 = \frac{1}{G} \cdot \frac{V_E \cos \Sigma_t}{V_B \cos \beta_t}$$

If one now introduces the speed of approach $V_r$ and the total interception time $T$, such that $D_t = V_r (T-t)$, one has:

$$\frac{\partial \Sigma_t}{\partial_t} = \frac{K_1}{T-t} \Delta\Sigma_t \qquad (2)$$

with $$K_1 = \frac{V_B \cos \beta_t}{V_r}$$

The applied guidance law is of the form:

$$\alpha_{ot} = b - a \int_0^t \delta dt$$

or alternatively:

$$a \int_0^t \delta dt - \delta + \alpha_t = b$$

$b$ being the initial value of $\alpha$ and $a$ the transfer constant of the guidance servo-mechanism.

If the initial values $\Sigma_t$ and $\Delta\Sigma_t$ at the instant of acquisition be designated by $\Sigma_0$ and $\Delta\Sigma_0$, one has:

$$b = \Sigma_0 + \Delta\Sigma_0$$

This guidance or correction law which characterizes the invention may be written:

$$\alpha_{0t} = \Sigma_0 + \Delta\Sigma_0 - a \int_0^t \delta dt$$

namely:

$$\alpha_{0t} = \Sigma_0 + \Delta\Sigma_0 - aK_2(\Sigma_t - \Sigma_0)$$

whence:

$$\Delta\Sigma_t = \alpha_{0t} - \Sigma_t = \Delta\Sigma_0 (1 + aK_2)(\Sigma_0 - \Sigma_t)$$

whence, from the relation (2):

$$\frac{\partial \Sigma_t}{\partial_t} = \frac{K_1}{T-t} [\Delta\Sigma_0 + (1+aK_2)(\Sigma_0 - \Sigma_t)]$$

and:

$$\Delta\Sigma_0 + (1+aK_2)(\Sigma_0 - \Sigma_t) = \Delta\Sigma_0 \left(1 - \frac{t}{T}\right) K$$

with $$K = K_1(1 + aK_2)$$

namely, $$\alpha_{0t} = \Sigma_t + \Delta\Sigma_0 \left(1 - \frac{t}{T}\right) K$$

It will be seen that by choosing $K > 1$, the angle $\alpha_{0t}$ rapidly tends towards the theoretical collision angle $\Sigma_t$.

Furthermore the equation $$\frac{\partial \Sigma_t}{\partial_t} = \frac{K_1}{T} \Delta\Sigma_0 \left(1 - \frac{1}{T}\right) K - 1$$

tends towards zero and, in consequence, the angular difference $\delta$ tends in turn towards zero also. Hence the instantaneous true bearing angle $\alpha_t$ tends towards $\Sigma_t$.

Furthermore, the acceleration decreases, as is shown by the expression $$\Gamma_E = \Delta\Sigma_0 \left(1 - \frac{t}{T}\right) K - 1 \frac{V_E^2 \cos \alpha}{D_{max}} \left(1 + \frac{a}{G}\right)$$

The navigational law defined precedingly therefore allows an approximately proportional navigation to be achieved without the need to measure the angular velocity of the missile-target line in relation to the direction of the missile velocity.

The advantages of this navigational method, which is equally applicable to the pre-guidance phase as well as to the final self-guidance phase, are as follows:

(a) Rational utilization of the missile dynamic possibilities;
 (b) Good pre-guidance accuracy;
 (c) A significant reduction in the ground computer installation;
 (d) Coherent guidance during transition from one guidance phase to the other;
 (e) Use of the same autopilot during both guidance phases.

Figure 2:
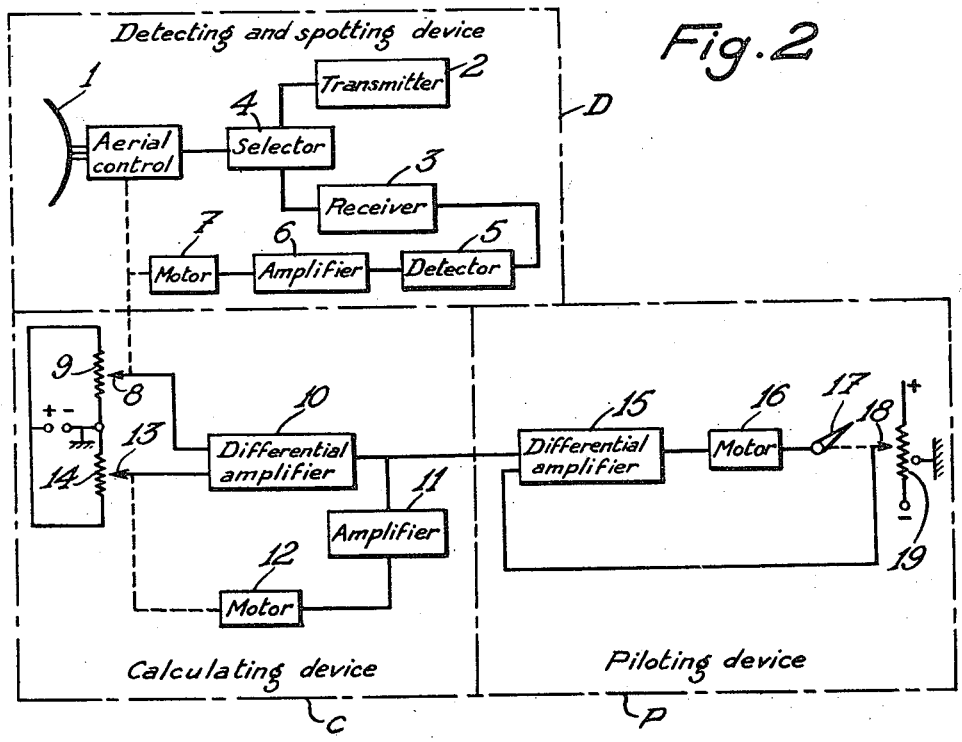
FIG. 2 is a diagrammatic illustration of one of the two chains of the self-guidance system according to the invention.

The self-guidance system which allows the navigational law defined above to be used is illustrated diagrammatically in FIG. 2 and more fully in FIG. 3.

This system consists in the association of a detecting and spotting device D, a calculating device C and a piloting device P. The detecting device is an angular spotting device which continuously furnishes the value of the true bearing angle $\alpha$ formed by the direction of the missile velocity and that of the straight line joining the missile to the target in space. It consists of a radar whose aerial is maintained in follow-up relation with the target. The calculating device gives a quantity $\delta$ defined by the integral equation:

$$a \int_0^t \delta dt - \delta + \alpha = b$$

where $a$ and $b$ are the constants defined precedingly. This is an analog calculating device. The piloting device imparts, to the missile, a load factor which is proportional to $\delta$.

The detecting and spotting device D consists simply of an aerial 1 associated to a transmitter 2 and a receiver 3 via a transmission-reception selector 4, and of an automatic target-pursuing device comprising a detector 5 of angular deviation, an amplifier 6 and a follow-up action generating motor 7 which drives the aerial. This motor also drives the slide 8 of a potentiometer 9 the output voltage of which is fed, in the calculating device C, into a differential amplifier 10. The output voltage of this differential amplifier 10 is transmitted, via an amplifier 11, to a motor 12 which actuates the slide 13 of a potentiometer 14 the output voltage of which feeds the differential amplifier 10. The output voltage of this differential amplifier 10 feeds, in the piloting device P, a differential amplifier 15 the output voltage of which supplies a follow-up action generating motor 16 connected to a flight control surface 17 of the missile and to the slide 18 of a potentiometer 19 the output voltage of which is applied to the differential amplifier 15.

FIG. 2 shows a follow-up system in one plane, either in elevation or in azimuth. In fact, there are two calculating chains, one for elevation and one for azimuth. The follow-up action on the aerial is omnidirectional, as shown in FIG. 3.

In the embodiment shown in this figure, use is made of a monopulse quadrature type radar with a paraboloid aerial 21 secured on a support 22 which carries a bevel pinion 23 the shaft 24 of which is carried by a support 25 on which is fitted a bevel pinion 26. Pinions 23 and 26 are the aerial elevation and azimuth control pinions respectively. The pinion 26 is carried by the fixed structure of the radar.

The radar comprises, in the usual way, a transmitter $2a$ and a receiver $3a$ connected to the paraboloid $21$ by a transmission-reception selector $4a$.

In order to directionally follow-up acting on the paraboloid $21$, the receiver $3a$ is connected to two detectors of angular deviation, $5a$ in azimuth and $5s$ in elevation. These detectors are respectively connected to amplifiers $6a$ and $6s$ which serve to feed two follow-up acting motors $7a$ in azimuth and $7s$ in elevation. The motor $7a$ is fixed to the fixed structure of the radar and the motor $7s$ is carried by a mobile portion joined to the support $25$. On the shaft of the azimuth motor $7a$ is fixed a bevel pinion $27$ which meshes with the azimuth bevel pinion $26$ while on the shaft of the elevation motor $7s$ is mounted a bevel pinion $28$ which meshes with the elevation bevel pinion $23$. Detectors $5a$, $5s$, amplifiers $6a$, $6s$, motors $7a$, $7s$, and pinions $23$, $26$, $27$, $28$ pertain to the conventional tracking device of the radar.

The azimuth pinion $26$ drives a shaft $29$ to which is keyed the slide $8a$ of a potentiometer $9a$ forming part of the azimuth calculating device $Ca$. The slide $8a$ is connected to the grid of a differential amplifier $10a$ the cathode of which is connected to the slide $13a$ of an auxiliary potentiometer $14a$. The potentiometers $9a$ and $14a$ have one of their ends connected to earth, the other ends being connected to a common source of current $30a$. The slide $13a$ is carried by a shaft $31a$ on which is fixed a bevel pinion $32a$ which meshes with a further bevel pinion $33a$ carried by the shaft of a linear actuator motor $12a$, with independent excitation $35a$, the armature of which is connected, on the one hand, to the anode of the differential amplifier $10a$ and, on the other, to the anode of a zero-setting triode $36a$ associated to a potentiometer $37a$.

For acting as a zero-setting device, as well known, the polarization of triode $36a$ is so determined that the terminal voltage of motor $12a$ is null when the grid and the cathode of the differential amplifier $10a$ are at the same potential.

The voltage obtained at the anode of the differential amplifier $10a$ is transmitted, in the device for guidance in azimuth $Pa$, to a differential amplifier $15a$ which serves to feed a follow-up acting motor $16a$ for the control surface $17a$ in azimuth. The shaft $38a$ of this control surface carries a bevel pinion $39a$ which meshes with a bevel pinion $40a$ carried by the shaft of the follow-up acting motor $16a$. This shaft $38a$ also carries the slide $18a$ of a potentiometer $19a$, said slide being connected to the differential amplifier $15a$.

Connections similar to those which have just been described in respect of the azimuth self-guidance chain are used for the elevation self-guidance chain, the corresponding elements being designated by the same reference numerals followed by the letter $s$.

The system described hereinabove operates as follows, in azimuth for example:

Acted upon by the azimuth follow-up acting motor $7a$, which directs the paraboloid $21$ into the detected direction of azimuth, the pinion $26$ drives the shaft $29$ and, hence, the slide $8a$, causing the latter to be traversed from its initial position through an angel equal to the true bearing angle $\alpha$ in azimuth.

When the system is energized, the positions of the slides $8a$ and $13a$ of potentiometers $9a$ and $14a$ are identical, the true and desired bearing angles $\alpha$ and $\alpha_0$ being equal to each other and to the constant $b$. The function of the remainder of the calculating device $Ca$ is then to determine the quantity $\delta$ which is obtained from the difference between the true and the desired bearing angles. Furthermore, the desired bearing angle $\alpha_0$ varies continuously in terms of this difference $\delta$ according to the law:

$$\alpha_0 = b - a \int_0^t \delta dt$$

where $a$ is the transfer constant of the amplifier $10a$ and of the motor $12a$ of the computer device $Ca$. This constant $a$ must also satisfy the condition:

$$K_1(1+aK_2) > 1$$

The azimuth calculator motor $12a$ drives the slide $13a$ of the desired-bearing-angle potentiometer $14a$ at an angular velocity proportional to $\delta$, so that the angular position of this slide is proportional to $\int \delta dt$. Assuming the motor $12a$ to be rotating in the proper direction, the angular position of the slide $13a$, with respect to its original position, will be given by:

$$\alpha_0 = b - a \int_0^t \delta dt$$

In fact, the differential amplifier $10a$ establishes the difference between the voltage fed by slide $8a$ and which is proportional to $\alpha$ and that fed by slide $13a$ and which is proportional to $\alpha_0$, so that its output voltage is $\delta = \alpha - \alpha_0$.

It results from said two last equalities that if $\delta$ differs from zero, i.e. if the potentials of the grid and cathode of the differential amplifier $10a$ are different, motor $12a$ is running. As soon as said potentials are equal, $\delta$ then becoming null, said motor stops in the corresponding position without reaching any predetermined null position.

It will be seen then, that, starting on the basis of a true bearing angle in azimuth of $\alpha$, the azimuth calculating device furnishes, as a function of time, a voltage such that:

$$\delta = \alpha_t - b + a \int_0^t \delta dt$$

The angular position of the slide $8a$ of the potentiometer $9a$ of true bearing angle $\alpha$ in azimuth is defined with respect to the axis of the missile, the output voltage of this potentiometer being $V_1$ when the aerial is aligned in the direction of the missile axis. The angular position of the slide $13a$ of the potentiometer $14a$ of desired bearing angle $\alpha_0$ in azimuth is defined with respect to an origin such that, at that point, the output voltage of this potentiometer shall be equal to $V_1$.

The voltage $\delta$ obtained on exit from the differential amplifier $10a$ is transmitted to the differential amplifier $15a$ of the azimuth guidance device $Pa$ and enables a degree of deflection which is proportional to this voltage, and hence to $\delta$, to be given to the azimuth control surface $17a$.

The control surface in azimuth $17a$ is connected with the slide $18a$ of the potentiometer $19a$ of the guidance device, and the output voltage of this potentiometer $19a$ is proportional to the angle of deflection of that control surface. This output voltage is compared to the voltage $\delta$ in the differential amplifier $15a$ so that, if these two voltages are unequal, a voltage is applied to the motor $16a$ in order to move the control surface $17a$ into the position required for the two voltages to be equal.

The same manner of operation applies to the elements which form the chain in elevation.

Clearly, many modifications may be made to the self-guidance method and system described hereinbefore without departing from the scope of the invention as defined in the appended claims. Thus the radar of the sensing device may be of any type whatsoever. In particular, it could be of the type described in the U.S. patent application Serial No. 804,788, now Patent No. 3,032,760, filed on April 7, 1959, by the applicant. Similarly, the potentiometers could be replaced by any suitable electrical rotatable element capable of providing an output voltage proportional to an input angle, a selsyn device being an example.

What I claim is:

1. A system for the self-guidance of a missile equipped with flight control-surfaces to a moving target comprising, in combination on the missile, means for angularly detecting and spotting the target with respect to the missile axis in order to continuously give the value of the instantaneous true bearing angle $\alpha_t$ with respect to said axis, means for analog calculation connected to said detecting and spotting means for receiving therefrom said value of the instantaneous true bearing angle to determine from said value and from that of an initial desired bearing angle $b$ an instantaneous desired bearing angle $\alpha_{0t}$ fulfilling the relation:

$$a\int_0^t \delta dt - \delta + \alpha_t = b$$

where $a$ is a constant representing the transfer constant of the calculation means, $\alpha_t$ is the instantaneous true bearing angle, and $\delta$ is the angular difference $(\alpha_t - \alpha_{0t})$ between the instantaneous true and desired bearing angles, and a piloting means connected to said calculation means which transmits to it an order related to the value of said angular difference $\delta$ and connected to the missile control-surfaces for deflecting said surfaces through an angle proportional to the value of said angular difference $\delta$.

2. A system for the self-guidance of a missile equipped with flight control-surfaces to a moving target comprising, in combination on the missile, a detecting and spotting device of the instantaneous true bearing angle of the target with respect to the missile axis, and, for each one of two planes at right angles passing through said axis, an analog calculating assembly comprising a first circular potentiometer having a rotatable central slide mechanically connected to the detecting and spotting device so that said slide is controlled and angularly rotated through an angle equal to that of the projection $\alpha_t$ on said plane of said instantaneous true bearing angle, a differential amplifier having two inputs one of which is electrically connected to said slide, a linear motor having an independent excitation and electrically connected to the output of said differential amplifier, a second circular potentiometer having a rotatable central slide electrically connected to the other input of said differential amplifier, a source of current on which said two potentiometers are mounted in parallel, means for rendering null the terminal voltage of said motor as soon as the two inputs of said differential amplifier are at the same potential and a mechanical transmission interconnecting said motor and the slide of said second potentiometer so that said second slide is angularly rotated through an angle equal to the instantaneous desired bearing angle $\alpha_{0t}$ on said plane at an angular speed proportional to the angular difference $\delta$ between the angular displacements of the two slides from their initial positions, whereby $\delta$ is equal to the angular difference $(\alpha_t - \alpha_{0t})$ between the instantaneous true and desired bearing angles on said plane while said instantaneous desired bearing angle $\alpha_{0t}$ fulfills the relation:

$$a\int_0^t \delta dt - \delta^{0t} + \alpha_t = b$$

where $b$ is the initial value of the true bearing angle on said plane and $a$ the transfer constant of the differential amplifier and of the linear motor, and a piloting assembly electrically connected to the output of said differential amplifier and mechanically connected to the missile flight control-surfaces corresponding to said plane for deflecting said surfaces through an angle proportional to said angular difference $\delta$.

3. A system for the shelf-guidance of a missile equipped with flight control-surfaces to a moving target comprising, in combination on the missile, a detecting and spotting device of the instantaneous true bearing angle of the target with respect to the missile axis, and, for each one of two planes at right angles passing through said axis, analog calculating means connected to the detecting and spotting device for receiving therefrom the value of the instantaneous true bearing angle $\alpha_t$ of the target in said plane with respect to the missile axis to determine from said value and from that of an initial desired bearing angle $b$ an instantaneous desired bearing angle $\alpha_{0t}$ fulfilling the relation:

$$a\int_0^t \delta dt - \delta + \alpha_t = b$$

where $a$ is a constant representing the transfer constant of the calculation means, $\alpha_t$ is the instantaneous true bearing angle, and $\delta$ is the angular difference $(\alpha_t - \alpha_{0t})$ between the instantaneous true and desired bearing angles, and a piloting assembly comprising a differential amplifier having two inputs one of which electrically connected to said analog calculating assembly is fed by the output voltage thereof, a follow-up acting motor for the corresponding flight control-surfaces electrically connected to the output of said diffreential amplifier, a circular potentiometer having a rotatable central slide electrically connected to the other input of said differential potentiometer, a first mechanical transmission interconnecting said slide to the corresponding flight control-surfaces, a second mechanical transmission interconnecting said follow-up acting motor and said first transmission, and a source of current connected to said potentiometer whereby said control-surfaces are deflected through an angle proportional to said angular difference $\delta$ while the output voltage of the potentiometer of said piloting assembly is compared with the output voltage of said calculating assembly for equalizing said voltages if different by a new deflection of said control-surfaces.

4. A system for the self-guidance of a missile equipped with flight control-surfaces to a moving target comprising, in combination on the missile, a detecting and spotting device of the instantaneous true bearing angle of the target with respect to the missile axis, for each one of two planes at right angles passing through said axis analog calculating assembly comprising a first circular potentiometer having a rotatable central slide mechanically connected to the detecting and spotting device so that said slide is through an angle equal to that of the projection $\alpha_t$ on said plane of said instantaneous true bearing angle, a differential amplifier having two inputs one of which is electrically connected to said slide, a linear motor having an independent excitation and electrically connected to the output of said differential amplifier, a second circular potentiometer having a rotatable central slide electrically connected to the other input of said differential amplifier, a source of current on which said two potentiometers are mounted in parallel, means for rendering null the terminal voltage of said motor as soon as the two inputs of said differential amplifier are at the same potential and a mechanical transmission interconnecting said motor and the slide of said second potentiometer so that said second slide is angularly rotated through an angle equal to the instantaneous desired bearing angle $\alpha_{0t}$ on said plane at an angular speed proportional to the angular difference $\delta$ between the angular displacements of the two slides from their initial positions, whereby $\delta$ is equal to the angular difference $(\alpha_t - \alpha_{0t})$ between the instantaneous true and desired bearing angles on said plane while said instantaneous desired bearing angle $\alpha_{0t}$ fulfills the relation:

$$a\int_0^t \delta dt - \delta^{0t} + \alpha_t = b$$

where $b$ is the initial value of the true bearing angle on said plane and $a$ the transfer constant of the differential amplifier and of the linear motor and a piloting assembly comprising a second differential amplifier having two inputs one of which electrically connected to said first differential amplifier is fed by the output voltage thereof, a follow-up acting motor for the corresponding flight control-surfaces electrically connected to the output of said second differential amplifier, a third circular potentiometer having a rotatable central slide electrically connected to the other input of said second differential potentiometer, a second mechanical transmission interconnecting said third slide to the corresponding flight control-surface, a third mechanical transmission interconnecting said follow-up acting motor and said second transmission, and a second source of current connected to said third potentiometer, whereby said control-surfaces are deflected through an angle proportional to said angular difference $\delta$ while the output voltage of the potentiometer of said piloting assembly is compared with the output voltage of said calculating assembly for equalizing said voltages if different by a new deflection of said control-surfaces.

5. A system for the self-guidance of a missile equipped with flight control-surfaces to a moving target comprising, in combination on the missile, a detecting and spotting device comprising a monopulse quadrature type radar having an aerial directionally adjustable in azimuth and in elevation, a transmitter, a receiver, a transmission-reception selector electrically connecting said transmitter and receiver to said aerial, and a tracking device, having two detectors of angular deviation respectively in azimuth and in elevation electrically connected to said receiver, two amplifiers electrically connected to said detectors, respectively, two follow-up acting motors in azimuth and in elevation electrically connected to said amplifiers and two mechanical transmissions respectively connecting said aerial to said follow-up acting motors, whereby the aerial is aligned to the target along a direction determining with respect to the missile axis the azimuthal and elevational instantaneous true bearing angles of said target; and two self-guiding assembly respectively in azimuth and in elevation each one of which comprises means for analog calculation mechanically connected to the corresponding follow-up acting motor for receiving therefrom the corresponding value of the instantaneous true bearing angle $\alpha_t$ to determine from said value and from that of an initial desired bearing angle $b$ an instantaneous desired bearing angle $\alpha_{0t}$ fulfilling the relation:

$$a\int_0^t \delta dt - \delta + \alpha_t = b$$

where $a$ is a constant representing the transfer constant of the calculation means, $\alpha_t$ is the instantaneous true bearing angle, and $\delta$ is the angular difference $(\alpha_t - \alpha_{0t})$ between the instantaneous true and desired bearing angles, and a piloting means connected to said calculation means which transmits to it an order related to the corresponding value of said angular difference $\delta$ and connected to the missile control-surfaces for deflecting said surfaces through an angle proportional to the value of said angular difference $\delta$.

6. A system according to claim 5, wherein a stationary support carries the follow-up acting motor in azimuth, the transmitter, the receiver, the selector, the detectors and the amplifiers, a second support pivotally mounted on said stationary support carries the follow-up acting motor in elevation, a mechanical connection interconnects said second support and said follow-up acting motor in azimuth, a third support pivotally mounted on said second support about an axis at right angles to the pivotal axis of said second support carries the aerial, and a mechanical connection interconnects said third support and said follow-up acting motor in elevation.

7. A system for the self-guidance of a missile equipped with flight control-surfaces to a moving target comprising, in combination on the missile, a detecting and spotting device comprising a monopulse quadrature type radar having an aerial directionally adjustable in azimuth and in elevation, a transmitter, a receiver, and a transmission-reception selector electrically connecting said transmitter and receiver to said aerial, and a tracking device having two detectors of angular deviation respectively in azimuth and in elevation electrically connected to said receiver, two amplifiers electrically connected to said detectors, respectively, two follow-up acting motors in azimuth and in elevation electrically connected to said amplifiers and two mechanical transmissions respectively connecting said aerial to said follow-up acting motors, whereby the aerial is aligned to the target along a direction determining with respect to the missile axis the azimuthal and elevational instantaneous true bearing angles of said target; two analog calculating assemblies respectively in azimuth and in elevation each one of which comprises a first circular potentiometer having a rotatable central slide mechanically connected to the corresponding follow-up acting motor so that said slide is angularly rotated through an angle equal to the corresponding instantaneous true bearing angle $\alpha_t$, a differential amplifier having two inputs one of which is electrically connected to said slide, a linear motor having an independent excitation and electrically connected to the output of said differential amplifier, a second circular potentiometer having a rotatable central slide electrically connected to the other input of said differential amplifier, a source of current on which said two potentiometers are mounted in parallel, means for rendering null the terminal voltage of said motor as soon as the two inputs of said differential amplifier are at the same potential and a mechanical transmission interconnecting said motor and the slide of said second potentiometer so that said second slide is angularly rotated through an angle equal to the corresponding instantaneous desired bearing angle $\alpha_{0t}$ at an angular speed proportional to the angular difference $\delta$ between the angular displacements of the two slides from their initial positions, whereby $\delta$ is equal to the angular difference $(\alpha_t - \alpha_{0t})$ between the instantaneous true and desired bearing angles on said plane while said instantaneous desired bearing angle $\alpha_{0t}$ fulfills the relation:

$$a\int_0^t \delta dt - \delta^{0t} + \alpha_t = b$$

where $b$ is the initial value of the true bearing angle on said plane and $a$ the transfer constant of the differential amplifier and of the linear motor; and two piloting assemblies respectively in azimuth and in elevation each one of which comprises a second differential amplifier having two inputs one of which electrically connected to said differential amplifier of the corresponding analog calculating assembly is fed by the output voltage thereof, a second follow-up acting motor for the corresponding flight control-surfaces electrically connected to the output of said second differential amplifier, a third circular potentiometer having a rotatable central slide electrically connected to the other input of said second differential potentiometer, a second mechanical transmission interconnecting said third slide to said flight control-surfaces, a third mechanical transmission interconnecting said second follow-up acting motor and said second transmission, and a second source of current connected to said third potentiometer, whereby said control-surfaces are deflected through an angle proportional to said angular difference $\delta$ while the output voltage of the potentiometer of said piloting assembly is compared with the output voltage of said calculating assembly for equalizing said voltages if different by a new deflection of said control-surfaces.

8. A system for the self-guidance of a missile equipped with flight control-surfaces to a moving target comprising, in combination on the missile, means for angularly detecting and spotting the target with respect to the missile axis in order to continuously give the value of the instantaneous true bearing angle $\alpha_t$ of said target with respect to said axis; electrical means for analog calculation connected to said detecting and spotting means for receiving therefrom said value of the instantaneous true bearing angle $\alpha_t$ and having electrical means to determine from said value and from that $b$ of an initial desired bearing angle an instantaneous desired bearing angle $\alpha_{0t}$ fulfilling the relation:

$$a\int_0^t \delta dt - \delta + \alpha_t = b$$

where $a$ is a constant representing the transfer constant of the calculation means and $\delta$ the angular difference ($\alpha_t - \alpha_{0t}$) between the instantaneous true and desired bearing angles, and means for transforming said angular difference $\delta$ into a proportional voltage; and an electrical piloting means receiving said voltage proportional to said angular difference $\delta$ and connected to the missile control-surfaces for deflecting said surfaces through an angle proportional to the value of said angular difference $\delta$, and means for equalizing the resultant actual deflection of said surfaces and the desired deflection thereof proportional to $\delta$.

References Cited by the Examiner
UNITED STATES PATENTS

| | | |
|---|---|---|
| 2,512,693 | 6/50 | Sparks et al. |
| 2,791,738 | 5/57 | Pringle _____ 244—77 X |
| 2,892,600 | 6/59 | Ergen _____ 343—7 X |
| 2,992,423 | 7/61 | Floyd et al. _____ 343—6 |

SAMUEL FEINBERG, *Primary Examiner.*
CHESTER L. JUSTUS, *Examiner.*